Nov. 27, 1928.

B. C. STICKNEY

TYPEWRITING MACHINE

Filed Sept. 21, 1926

1,693,533

Inventor:

Durnham C Stickney

Patented Nov. 27, 1928.

1,693,533

UNITED STATES PATENT OFFICE.

BURNHAM C. STICKNEY, OF PORTSMOUTH, NEW HAMPSHIRE, ASSIGNOR TO UNDERWOOD ELLIOTT FISHER COMPANY, OF NEW YORK, N. Y., A CORPORATION OF DELAWARE.

TYPEWRITING MACHINE.

Application filed September 21, 1928. Serial No. 136,755.

This invention relates to sound-deadening platens for typewriting machines. One of its objects is to provide a simple and inexpensive quiet platen, which will substantially absorb the vibration set up by the type-blows, while at the same time presenting a hard surface to the types, thereby rendering the machine especially adapted for manifolding.

The advantage of using lead or plastic material for constructing a platen so as to prevent vibration thereof, is set forth in my pending application No. 710,768, filed May 3, 1924. However, a platen made of this material is weak, and is liable to bend when made of great length.

According to one feature of this invention, means are provided for stiffening the platen, to prevent distortion thereof. According to another feature, the outer surface of the platen is made hard to facilitate manifolding. To these ends, there is provided a steel tubing, which is surrounded with a shell of soft rubber, which shell serves as a backing for a lead tubing driven thereon. The lead tubing is shorter than the steel tubing to allow room for rubber collars at each end, which are cemented to the steel tubing and to the ends of the lead tubing. This forms the core of the platen, which is cylindrical and of uniform diameter throughout its length. A thin sheet of rubber is wound, under tension, over this core and serves as a backing for a hard sheath of celluloid which is cemented over the rubber. The hard sheath prevents local yielding of the platen when struck by the types.

The thin sheet of stretchable rubber tightly wound around the lead tube presents a highly elastic backing for the celluloid, because of the high tension under which it is wound. However, the local yield to the types is much reduced as compared with the untensioned rubber usually provided for platen-jackets.

The outer surface is preferably made of celluloid, which is excellent for manifolding. It has been found that a platen made in this manner is excellent for clearness of printing, because of the outer hard layer, while the intervening layer of soft material between the celluloid and the lead gives the further effect of quietness. The lead being of an inherent plastic nature prevents bodily vibration of the platen, which further reduces the noise of the type-blows. The inertia of the heavy platen resulting from the weight of the lead assists also in preventing bodily vibration of the platen and further conduces to quiet operation.

The finished cylinder is resiliently mounted on an axle by means of intervening soft rubber collars, which are cemented to the steel tubing and over end caps which are fast to the axle. The platen may be finished to the exact diameter by grinding.

Other features and advantages will hereinafter appear.

In the accompanying drawings.

Figure 1:
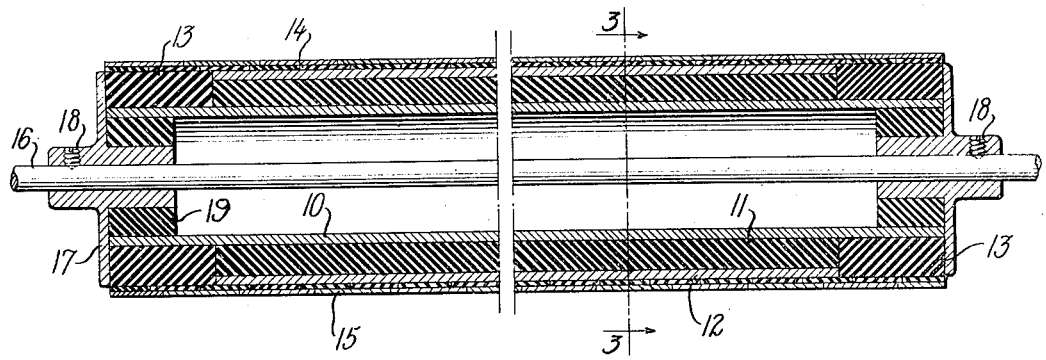
Figure 1 is a cross-sectional view, showing the structure of the platen.
Figure 2:
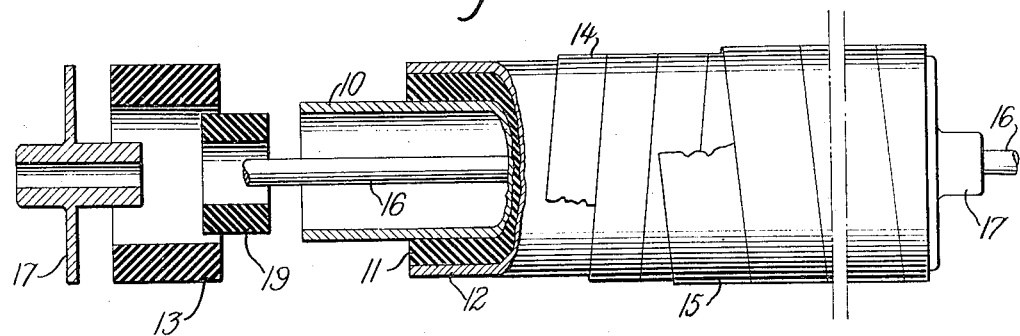
Figure 2 is a diagrammatic view, showing the manner of constructing the platen.
Figure 3:
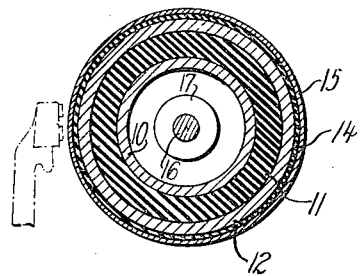
Figure 3 is a cross-sectional view through line 3—3 of Figure 1.

A steel tube 10 serves as a base upon which the platen is built. This tube may be about one inch, outside diameter, and one-sixteenth in wall-thickness, the length of the platen being equal to the length of the tube. A rubber shell 11 is driven over the steel tube and serves as a backing for a lead tube 12, which is in turn driven over the rubber shell. The rubber shell is preferably made of soft Pará rubber, and may be about one-quarter of an inch thick. The rubber shell is driven over the steel tube, and is cemented, or otherwise secured to the tube. The lead tube may be a piece of straightened commercial lead pipe such as is used for plumbing work. Both the rubber shell and the lead tube are held in place by means of end collars 13, which are made of soft rubber. The outside diameter of these collars is equal to the outside diameter of the lead tube.

As has been stated in my prior application, the lead is effective to prevent vibration of the platen, because of its weight. Due to its plastic nature, however, lead is liable to be pitted by the type-blows. To prevent this, it is proposed to wind over the lead a thin sheet of stretched rubber 14, and then wind over the rubber a thin sheet of celluloid 15. The celluloid may be wound in the form of a strip one inch wide, which is cemented to the rubber. The original thickness of the celluloid may be one thirty-second of an inch, which is subsequently reduced to one sixty-fourth of an inch when the platen is trued by grinding.

In order to provide a resilient connection between this built-up core and its supporting axle 16, there is provided a pair of end plates 17, which are fast to the axle by means of screws 18, and a pair of rubber collars 19, which may be cemented to the inner surface of the steel tube 10 and to the end plates.

Variations may be resorted to within the scope of the invention, and portions of the improvements may be used without others.

Having thus described my invention, I claim:

1. A platen for a typewriting machine, including, in combination, a metal tube, a soft rubber shell for encasing said tube, a lead tube overlying said shell, a thin sheet of tightly-wound rubber, and a sheath of tightly wound celluloid.

2. A platen for a typewriting machine, including, in combination, a metal tube, a soft rubber shell for encasing said tube, a lead tube overlying said shell, a tightly-wound covering of hard material for protecting said lead tube against the type-blows, and a thin layer of soft material between the covering and the lead tube.

3. A platen for a typewriting machine, including, in combination, an axle, a metal tube, collars of resilient material for carrying said tube, said collars being carried by said axle, and alternate layers of resilient and plastic material, said layers including a soft rubber shell overlying the metal tube, a tube of plastic material over said rubber shell, a thin layer of rubber over said plastic material, and a thin outermost sheath of celluloid.

4. A platen for a typewriting machine, including a metal tube, end flanges fast upon a platen-axle, rubber collars carried by said flanges for resiliently supporting said tube, a rubber shell secured to the tube, a lead tube over said shell, the latter and the lead tube being shorter than the metal tube, a pair of rubber collars secured to the metal tube at the ends thereof, the inner surface of the collars being cemented to the ends of the rubber shell and to the lead tube, the whole forming a cylindrical body of uniform diameter, a sheath of protecting material to present a hard local non-yielding surface to the types, and a backing of soft material for said sheath.

5. A platen for a typewriting machine, including a metal tube, end flanges fast upon a platen-axle, rubber collars carried by said flanges for resiliently supporting said tube, a rubber shell secured to the tube, a lead tube over said shell, the latter and the lead tube being shorter than the metal tube, a pair of rubber collars secured to the metal tube at the ends thereof, the inner surface of the collars being cemented to the ends of the rubber shell and to the lead tube, the whole forming a cylindrical body of uniform diameter, a tightly-wound layer of thin rubber over said cylindrical surface, and a sheath of celluloid tightly wound over said layer of thin rubber.

6. A cylindrical platen for a typewriting machine, including a reinforced lead core and a thin stiff covering for said core, the latter serving as a means for protecting the lead core against type-blow identations, said stiff covering being backed by an intervening thin layer of flexible material.

7. A cylindrical platen for a typewriting machine, including a reinforced lead core and a thin stiff covering for said core, the latter serving as a means for protecting the lead core against type-blow indentations, said stiff covering being backed by an intervening thin layer of flexible material, and means for cushioning said core upon a supporting platen-axle.

8. A cylindrical platen for a typewriting machine, including a reinforced lead core and a thin stiff covering for said core, the latter serving as a means for protecting the lead core against type-blow indentations, said stiff covering being backed by an intervening thin layer of flexible material, and means for cushioning said core upon a supporting platen-axle, said means including end flanges secured to the axle and rubber rings secured to the flanges and to the core.

BURNHAM C. STICKNEY.